(12) United States Patent
Hatanaka et al.

(10) Patent No.: US 7,402,811 B2
(45) Date of Patent: Jul. 22, 2008

(54) ULTRA-HIGH RESOLUTION PIXEL ELECTRODE ARRANGEMENT STRUCTURE AND SIGNAL PROCESSING METHOD

(75) Inventors: Yoshinori Hatanaka, Hamamatsu (JP); Toru Aoki, Hamamatsu (JP); Yasuhiro Tomita, Hamamatsu (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 273 days.

(21) Appl. No.: 10/576,413

(22) PCT Filed: Oct. 20, 2004

(86) PCT No.: PCT/JP2004/015863

§ 371 (c)(1),
(2), (4) Date: Apr. 19, 2006

(87) PCT Pub. No.: WO2005/038924

PCT Pub. Date: Apr. 28, 2005

(65) Prior Publication Data

US 2007/0057190 A1     Mar. 15, 2007

(30) Foreign Application Priority Data

Oct. 21, 2003   (JP)   ............................. 2003-360408

(51) Int. Cl.
*G01T 1/24*   (2006.01)
(52) U.S. Cl. .............................. 250/370.09; 250/370.14
(58) Field of Classification Search ............ 250/370.09, 250/370.14
See application file for complete search history.

(56) References Cited

FOREIGN PATENT DOCUMENTS

| JP | 61-39573 | 2/1986 |
|---|---|---|
| JP | 61-55959 | 3/1986 |
| JP | 61-295656 | 12/1986 |
| JP | 63-272071 | 11/1988 |
| JP | 2-118952 | 9/1990 |
| JP | 5-236210 | 9/1993 |
| JP | 7-5 0743 | 2/1995 |
| JP | 7-161956 | 6/1995 |
| JP | 2000-324406 | 11/2000 |
| JP | 2002-314060 | 10/2002 |
| JP | 2003-57350 | 2/2003 |

OTHER PUBLICATIONS

International Search Report of PCT/JP2004/015863, dated Jan. 17, 2005.

*Primary Examiner*—David P. Porta
*Assistant Examiner*—Marcus H Taningco
(74) *Attorney, Agent, or Firm*—Westerman, Hattori, Daniels & Adrian, LLP.

(57) ABSTRACT

When a semiconductor sensor element used for detecting high-energy x-rays and gamma rays and an amplifier are connected via wires, the capacitances vary depending on the wires, thereby causing a sensitivity variation. To solve this, a structure for making the capacitances uniform is proposed.

If a staggered arrangement is used for high resolution, the capacitances by wiring are different from element to element, so dummy sensor mounting sections (2) are provided to electrode sections (3) to make the capacitance uniform. The width of the connection section is decreased depending on the wiring length so as to make the capacitance uniform.

7 Claims, 6 Drawing Sheets

(a) Conventional Pattern (b) Improved Pattern 1

(c) Improved Pattern 2

Fig.1

(a) Structure formed on a plane (b) Structure formed on a layer

Fig.2

(a) Staggered Arrengement (b) Pixel Shifted Arrengement

Fig.3

(a) Conventional Pattern  (b) Improved Pattern 1  (c) Improved Pattern 2

8 Board for Sensor    7 Board for Amplifier

Fig.8

Level 1    Lebel 3

Level 2    Level 4

4 Wiring Section

ULTRA-HIGH RESOLUTION PIXEL ELECTRODE ARRANGEMENT STRUCTURE AND SIGNAL PROCESSING METHOD

TECHNICAL FIELD

The present invention relates to a semiconductor sensor used for detecting high-energy x-rays and gamma rays.

BACKGROUND ART

For high-energy x-rays and gamma rays which have high transmittance, a sensor, made from materials having a high absorbing ability, that is having a high atomic weight, is used. Examples of these materials are CdTe, CdZnTe, $HgI_2$, $PbI_2$ and TlBr, and sensor elements made from these materials are arranged linearly or two-dimensionally, and current is read from an electrode attached to each element. The current which is read is pre-amplified, signal processing is performed thereon, and two-dimensionally arranged image signals are generated.

Normally in the case of a linear sensor, elements are arranged in a row, and signals are guided to the pre-amplifier via the wires disposed at equal spacing. In Japanese Patent Application Laid-Open No. H5-236210, it is proposed that the sensor sections are arranged in shifted positions in order to increase resolution in the linear sensor.

In the case of a semiconductor sensor, the capacitance between the pre-amplifier and the sensor has a major influence on the read signals, but in the case of a visible light sensor which can handle a large signal current amount, the influence thereof is minor, and can be adjusted in the signal processing in a subsequent step.

DISCLOSURE OF THE INVENTION

When a compound semiconductor CdTe, CdZnTe, TlBr or $HgI_2$ is used as a semiconductor sensor for detecting high-energy x-rays and gamma rays, mono-crystal material pieces thereof are arranged linearly or two-dimensionally as elements, current from a respective electrode is guided to an amplifier to be amplified to a required signal level, and signal processing is performed. The present invention is a technology related to wiring from the elements to the amplifier.

When these elements are arranged linearly or two-dimensionally, the spatial resolution is determined by the number of elements per unit area. Therefore to increase the resolution, the elements must be arranged at high density, but this has a limitation because of the technological restrictions on arrangement, such as bonding.

To solve this problem the elements are arranged sparsely while maintaining element space by using a staggered arrangement. When this sparse arrangement is used, signals in the area where an element does not exist are compensated by signals of another element in time and in space, and high resolution is generated when these signals are integrated, and this technology is called an "ultra-high resolution pixel configuration". In the case of a sensor used in the visible light area using silicon, the amplification part can be formed as a layered structure with the sensor, and a micro-processing technology can implement sufficient miniaturization, so wiring problems rarely occur.

Figure 1:
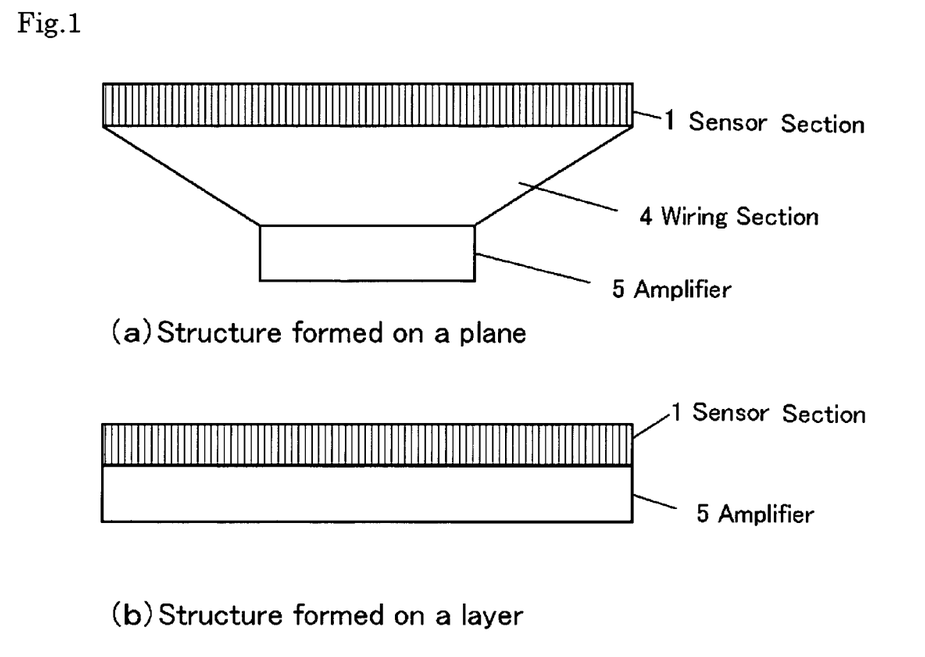
FIG. 1 is a diagram depicting a conventional sensor.

FIG. 1 shows the connection from the linear type sensor section 1 to the amplification section 5. FIG. 1-*a* is a sensor wherein the sensor section 1 and the amplification section 5 are integrated, and the sensor section 1 and the amplification section 5 are formed on a plane, and FIG. 1-*b* is a sensor wherein the sensor section 1 and the amplification section 5 are stacked in two levels, and the signal from the sensor is directly connected to the amplification section.

In the case of a sensor for high-energy x-rays and gamma rays however, the integrated amplifier is damaged if high-energy x-rays or gamma rays enter the amplifier, so the element sections and the amplification section must be spatially isolated from each other, and the amplification section must be shielded and protected from radiation. Because of this, the elements and the amplifier are connected by wiring.

In this case, the capacitance, by the wiring between the pre-amplifier and the sensor, increases, which has significant influence on the read signals.

It is an object of the present invention that focus is placed on the relative value in each sensor rather than on the absolute value of the capacitance, and the capacitance in each sensor is made uniform. This is because signal voltage varies depending on the capacitance, which makes signal processing in subsequent stages difficult.

Therefore when a staggered arrangement is used for the sensor section, the shapes of the electrode are designed to be identical so that capacitance in each element by wiring up to the amplifier becomes exactly the same.

Also the difference of capacitance, due to the difference in the length of wires when the wires are connected to the amplifier, is eliminated by adjusting the width of each wire.

The present invention is useful because when an ultra-high resolution pixel electrode arrangement, such as a staggered arrangement, is used, the sensitivity difference caused by the difference of capacitance can be decreased.

BEST MODE FOR CARRYING OUT THE INVENTION

Figure 2:
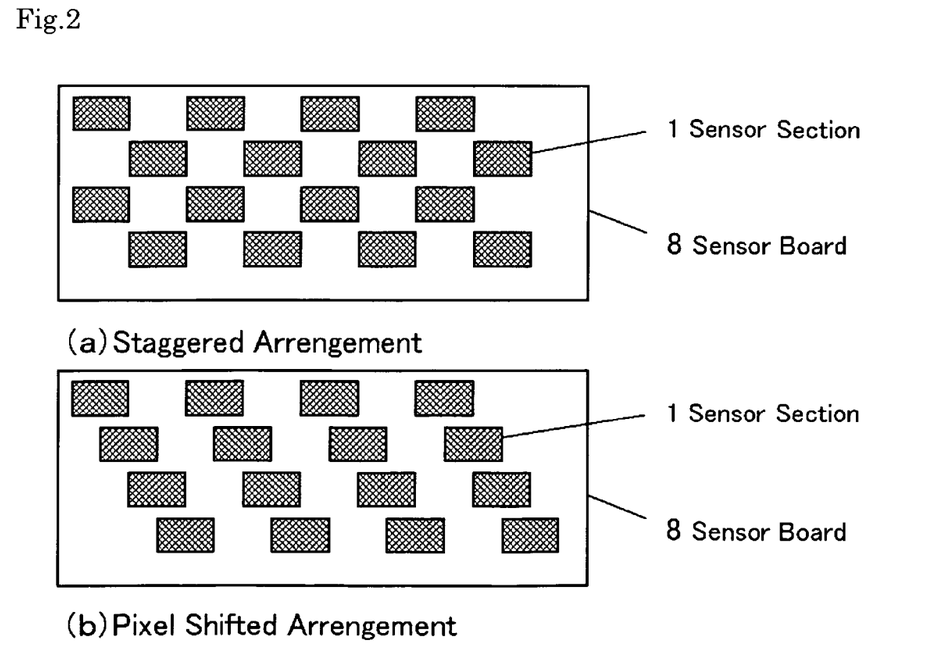
FIG. 2 are diagrams depicting a staggered arrangement and a pixel shifted arrangement.

As FIG. 2 shows, to implement high resolution, a staggered arrangement (FIG. 2-*a*) and a pixel shifted arrangement (FIG. 2-*b*) have been conventionally used for the arrangement of the light sensitive section of the sensor, but these are based on the case of visible lights, and no special consideration was made for making the capacitance uniform and for the wiring in signal reading.

Now the configuration to make the capacitance uniform in each sensor is shown.

EXAMPLE 1

Figure 3:
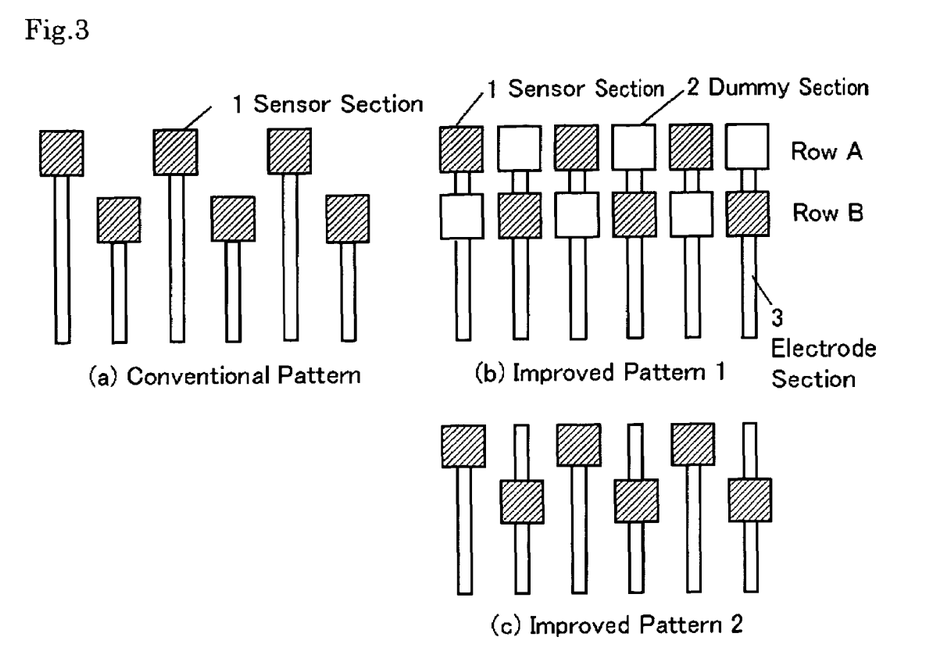
FIG. 3 are diagrams depicting an example of making the mounting board of the elements the same pattern, so as to make the capacitance uniform.

FIG. 3 shows the patterns of the electrode sections 3 on a board on which a sensor is mounted. FIG. 3-*a* is a conventional pattern where capacitance is not uniform since the lengths of the electrode sections 3 are different. In the case of the improved pattern in FIG. 3-*b* according to the present invention, the electrode sections 3 are patterned in the same way whether it is an odd number or even number even if a staggered arrangement is used, in order to make the capacitance uniform. In other words, capacitance differs because of the difference in the lengths of the wires, which makes voltage, to be generated from the same charges, different, and causes output variations, so in order to prevent this the same electrode structure is used, where a portion in which an element is mounted is laid out as the sensor section 1, and a portion in which an element is not mounted becomes a dummy section 2, where the electrode section 3 remains as is. The mounted elements result in a staggered arrangement.

As a variant form of this, as FIG. 3-*c* shows, the dummy section 2 may be an area smaller than the sensor section 1, that is it may have the same width as the lead wire of the electrode section 3. In this case the density of the sensor can be increased.

Figure 11:
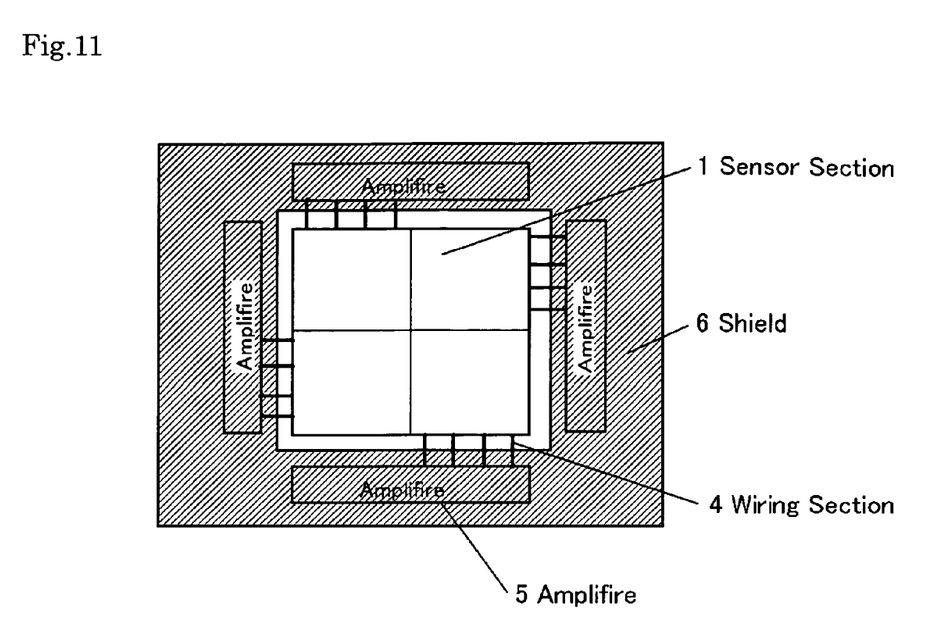
FIG. 11 is a diagram depicting the shield area viewed from the top face of a sensor.

An image detection sensor using CdTe crystals for detecting gamma rays will now be described. CdTe is weak to mechanical impact, so most careful attention is required for bonding so that the characteristics of the elements do not deteriorate. It is difficult to fabricate many elements closely arranged for image detection. If a staggered arrangement is used, element spacing can be increased, which is a huge advantage in terms of fabrication. In the case of this example, two rows of staggered arrangements are assumed to be row A and row B. Adjacent electrodes have a same shape so that the capacitance of the adjacent electrodes are the same, and the width of the wires are adjusted to eliminate the capacitance difference between the center and both ends, so that the capacitance of the connection wires, up to the amplifier, are uniform. Wires are shielded by earth electrodes at an appropriate spacing directly under the electrodes, and the wires are connected to the amplifier as strip lines. The amplifier is covered by a metal shield, such as lead, so as to be protected from radiation. The thickness of the cover must be determined depending on the magnitude of the energy, but it is about 1 mm to 1 cm. The common electrode side of the element is connected to the ground potential by an appropriate conductive material. FIG. 11 shows the shield area viewed from the top face of the sensor.

What was proposed above is to make the shape of the electrode section 3 identical and to adjust the width thereof depending on the length of the wiring section, so that the capacitance is uniform. But to make the capacitance uniform other configurations are also possible.

Figure 4:
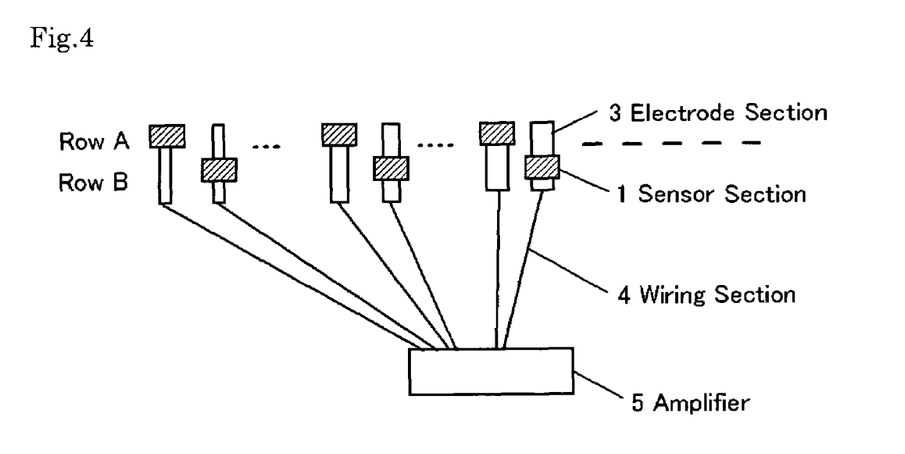
FIG. 4 is a diagram depicting an example of changing the area of the mounting board of an element.

FIG. 4 shows the way of making the capacitance uniform by changing the areas of the electrode sections 3. If the electrode sections 3 in FIG. 4 are adjusted, the widths of the electrode line width decreases as the element rows move away from the center toward both ends, so that the composite capacitance of the electrode section 3 and the wiring section 4, that are connected to the input of the amplifier, becomes the same for all the electrodes. In a staggered arrangement, the mounting positions of the elements are staggered, but the capacitances thereof, with respect to the amplifier, are all the same.

EXAMPLE 2

Figure 5:
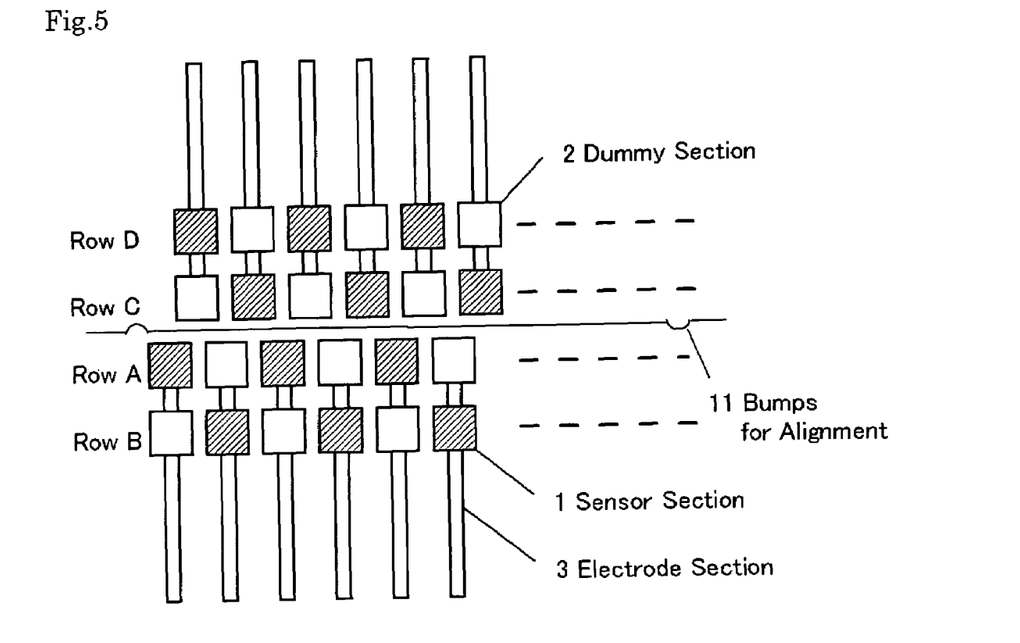
FIG. 5 is a diagram depicting an example of arranging two rows of staggered elements to face each other with a shifted ¼ pitch.

FIG. 5 shows an example of the boards, on which the elements are arranged in staggered positions, disposed so as to face each other in order to double the number of pixels to further increase resolution.

FIG. 5 is an example when two rows of staggered elements are facing the other two rows of elements with a shifted ¼ pitch from each other. By combining the respective two rows of staggered elements like this, four elements spatially constitute one pitch. If this configuration is used, signals are read alternately between the two boards facing each other, so an element can be read after the leak signal from its adjacent element attenuates, so the mutual influence of the signals of an adjacent element can be prevented.

If one block of a staggered arrangement is disposed with another one facing each other with a shifted ¼ pitch, then a pixel shifted arrangement can be easily implemented.

If the amplifiers for the element rows facing each other are installed isolated from each other, high-energy rays do not enter the amplifiers simultaneously, and the interference of high-energy radiation can be recovered by compensating the affected signals with signals from an unaffected amplifier.

It is assumed that the two rows of the staggered arrangement are row C and row D. Creating the bumps for alignment 11 is useful for aligning the two blocks facing each other.

It is also assumed that radiation moves in the sequence of row B, row A, row C and row D when an object moves to detect the spatial distribution of the x-ray or gamma ray radiation. The row A signals are recorded in the addresses 1*a*, 5*a*, 9*a*, . . . of the memory, row B signals are in 3*b*, 7*b*, 11*b*, . . . , row C signals are in 4*c*, 8*c*, 12*c*, . . . , and row D signals are in 2*d*, 6*d*, 10*d*, . . . If the moving time unit of the object is considered along with the spatial moving unit of the element arrangement, then composite signals 1, 2, 3, 4, 5, 6, . . . can be obtained as output signals by shifting the row B signals for three units, the row A signals for two units, and the row C signals for one unit, and combining them with the time of the row D signals.

For the timing and phase of reading signals from an element at this time, the present invention provides an improvement in avoiding the influence from adjacent elements, and in matching the wiring capacitance so that uniform signals are acquired.

By disposing blocks with two rows of staggered arrangements facing each other, a four row-staggered arrangement is created. And by disposing the blocks facing each other with a shifted ¼ pitch, these four rows of elements are shifted ¼ pitch from each other. When row A and row B in a staggered arrangement constitute one block, row A and row B are shifted ½ pitch from each other. If the block on which row C and row D are arranged is disposed facing this block with a shifted ¼ shifted pitch, the row D is shifted ¼ pitch from the row A, and row D and row B are shifted ¼ pitch from each other, and row B and row C are shifted ¼ pitch from each other. In this way each element can be arranged with a shifted ¼ pitch, from the adjacent row.

When signals are read from each element, if the signals are read in the sequence of row A, row D, row B and row C, then a reading time space can be generated between adjacent wires, and interference on the signal from the adjacent electrode can be prevented. In other words, if the signals are from A, D, B and C with a 1 cycle phase difference from each other, the signals can be read avoiding the mutual influence of A and B and of C and D. The signals read from rows A and B and from rows C and D are amplified and processed by the amplifiers, which face each other, but are spatially distant. This structure makes it difficult to receive critical influence by scattered radiation, and signals can be recovered easily even if influence is received. These are issues unique to a radiation sensor, and need not be considered in a normal sensor for visible lights.

The present invention is a major advance as a radiation sensor, where the amplifier must be disposed isolated from the sensor section, since the amplifier is damaged if high-energy radiation enters the amplifier, and a pair of amplifiers are disposed spatially distant from each other in order to prevent the influence of scattered radiation.

EXAMPLE 3

In the above description, the wiring section from the electrode section of the sensor to the amplification section is one used for a one-dimensional sensor, that is a linear type line sensor. However recent demands for a two-dimensional sensor is high. So [Example 3] proposes a connection to the amplification section in a two-dimensional sensor.

Figure 6:
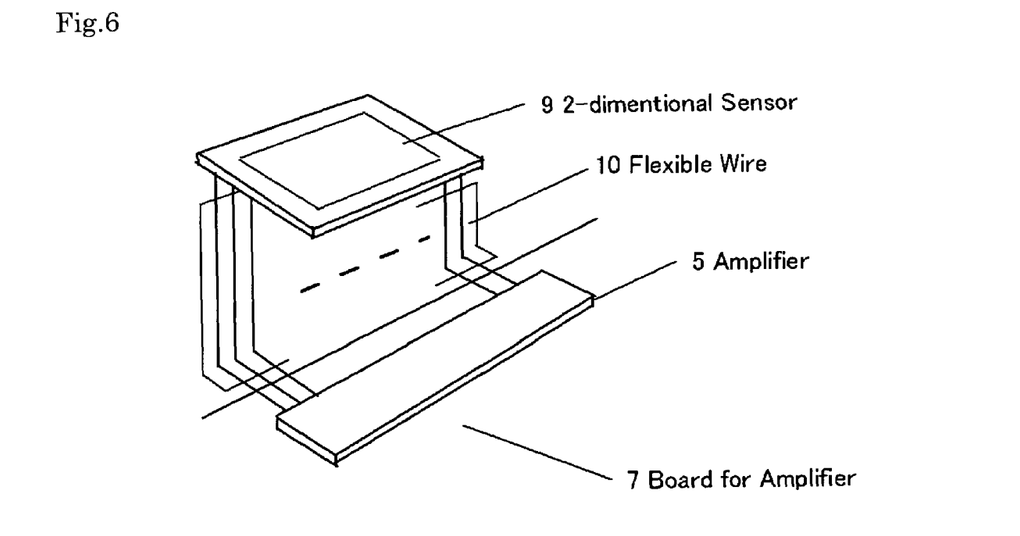
FIG. 6 is a diagram depicting the arrangement of lead wires from two-dimensional pins which use flexible wiring.

In FIG. 6, the electrode sections, which are led out from the two-dimensional sensor 9, are arranged two-dimensionally on the bottom face of the sensor. Each row of the two-dimensional terminals is connected to the amplification section 5 via a flexible wire 10. If the two-dimensional terminal is S (m, n), then S (1, j) (j is an integer in the 1- - - n range) is connected to one flexible wire 10, and m number of flexible wires 10 are used. In FIG. 6, S (1, 1), S (1, 2), . . . S(2, 1), S (2, 2) . . . are connected sequentially from the front of the amplification section 5, but may be in the sequence of S (1, 1), S (2, 1), S (3, 1) . . . S(1, 2), S(2, 2), 2(3, 2) . . .

Figure 7:
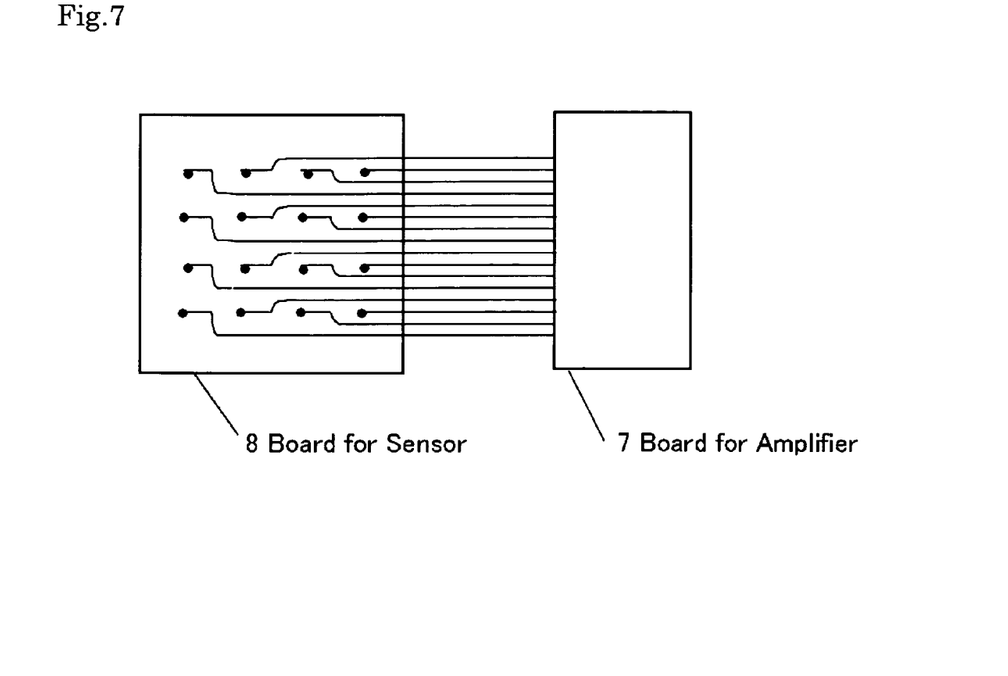
FIG. 7 is a diagram depicting the arrangement of lead wires from the connection pins on a single layer wiring board.

FIG. 7 shows the general arrangement of the lead wires on a printed board. In this case as well, the structure to make the capacitances uniform can be used.

Figure 8:
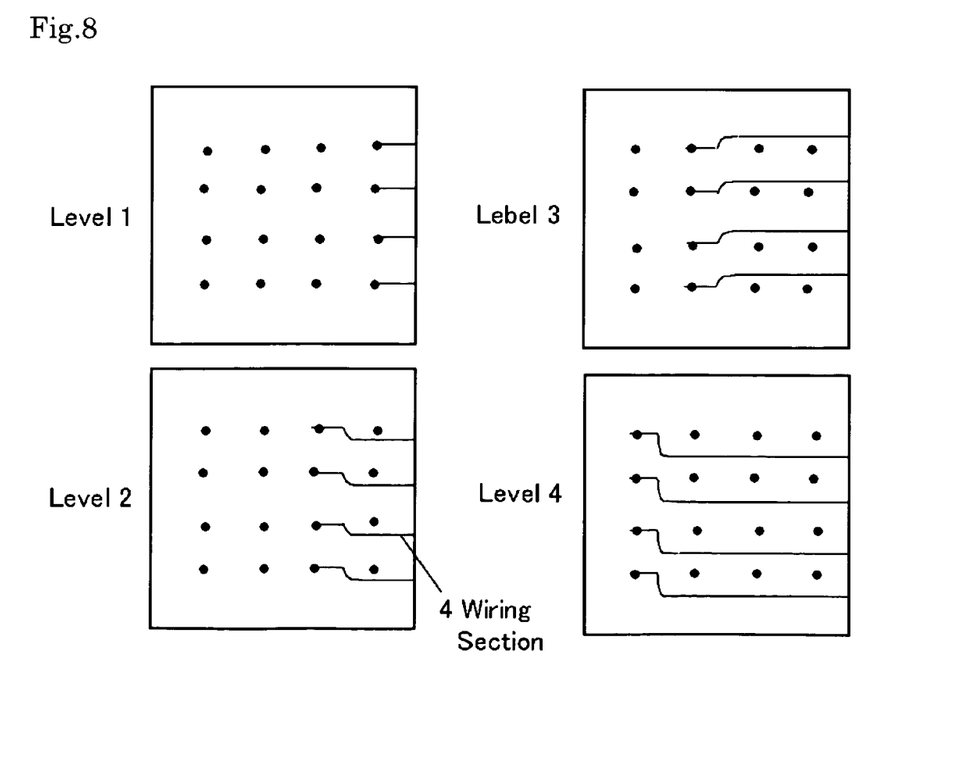
FIG. 8 is a diagram depicting the arrangement of lead wires of the wiring section in each level of a multi-layer wiring board.
Figure 9:
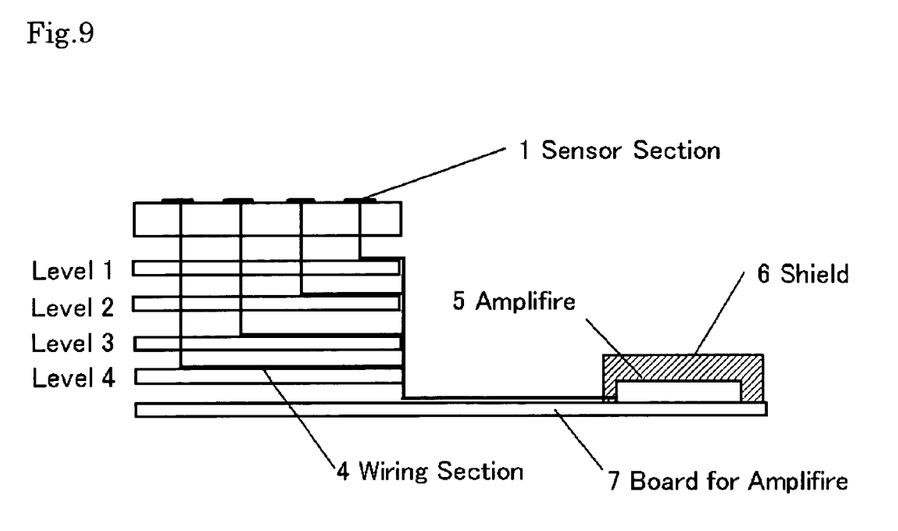
FIG. 9 is a diagram depicting the wire leading structure (1) viewed from the side face of the sensor on a multi-layered wiring board.

In the case of multi-layer boards, wires of each level are arranged as shown in FIG. 8, and the boards on each level are overlaid as shown in FIG. 9, and the wires from the sensor section 1 penetrate vertically and are connected. For this wiring as well, the structure for making the capacitances uniform can be used.

Figure 10:
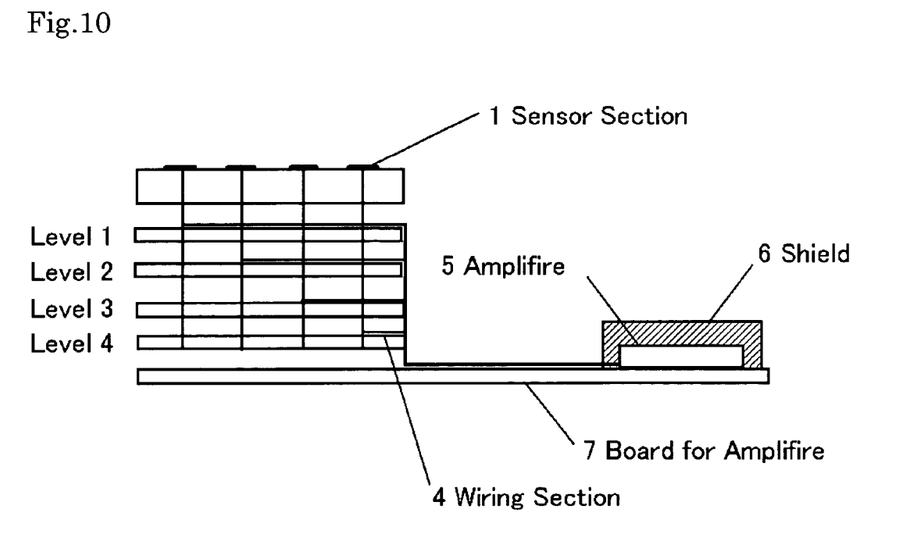
FIG. 10 is a diagram depicting the wire leading structure (2) viewed from the side face of the sensor in a multi-layer wiring board.

As shown in FIG. 10, the patterns on the first to fourth level can be the opposite of those in FIG. 8.

INDUSTRIAL APPLICABILITY

By making the capacitance of the wires uniform, the sensitivity unevenness of the sensor decreases, and signal processing in the subsequent stages becomes easier. Also by disposing identical sensor boards facing each other, the number of elements can be doubled easily, and by acquiring signals alternately from each board facing each other, the influence of leak signals of an adjacent wire decreases, and images become clearer.

The invention claimed is:

1. An arrangement structure of ultra-high resolution pixel electrodes in a device for detecting high-energy x-rays or gamma rays in which a plurality of sensor sections are arranged in shifted positions, including staggered positions, so as to acquire a resolution equal to or higher than the resolution determined by the dimensions of a sensor element, comprising:
a plurality of sensor sections;
a plurality of electrode sections on which said sensor sections are mounted;
an amplification section; and
a plurality of wiring sections for connecting said electrode sections and said amplification section, characterized in that
an area of said electrode section on which said sensor section is mounted and an area of the pattern of said wiring section are substantially the same in each sensor, so that the composite capacitance of each electrode section and each wiring section becomes the same in each sensor.

2. An arrangement structure of ultra-high resolution pixel electrodes in a device for detecting high-energy x-rays or gamma rays in which a plurality of sensor sections are arranged in shifted positions, including staggered positions, so as to acquire a resolution equal to or higher than the resolution determined by the dimensions of a sensor element, comprising:
a plurality of sensor sections;
a plurality of electrode sections on which said sensor sections are mounted;
an amplification section; and
a plurality of wiring sections for connecting said electrode sections and said amplification section, characterized in that
a dummy section on which the sensor section is not mounted is created on the electrode section on which the sensor section is to be mounted, so that the pattern of each electrode section has the same shape and the capacitance of each electrode section becomes the same.

3. An arrangement structure of ultra-high resolution pixel electrodes in a device for detecting high-energy x-rays or gamma rays in which a plurality of sensor sections are arranged in shifted positions, including staggered positions, so as to acquire a resolution equal to or higher than the resolution determined by the dimensions of a sensor element, comprising:
a plurality of sensor sections;
a plurality of electrode sections on which said sensor sections are mounted; an amplification section; and
a plurality of wiring sections for connecting said electrode sections and said amplification section, characterized in that
a dummy section on which the sensor section is not mounted is created on the electrode section on which the sensor section is to be mounted, so that the area of the pattern of each electrode section becomes the same, and the capacitance of each electrode section becomes the same.

4. An arrangement structure of ultra-high resolution pixel electrodes in a device for detecting high-energy x-rays or gamma rays in which a plurality of sensor sections are arranged, comprising:
a plurality of sensor sections;
a plurality of electrode sections on which said sensor sections are mounted;
an amplification section; and
a plurality of wiring sections for connecting said electrode sections and said amplification section, characterized in that
an area of each electrode section is different in order to match the composite capacitance of each electrode section and of each wiring section connected thereto in each sensor, so as to cancel the difference of capacitance depending on the length of each wiring section.

5. An arrangement structure of ultra-high resolution pixel electrodes in a device for detecting high-energy x-rays or gamma rays in which a plurality of sensor sections are arranged, comprising:

a plurality of sensor sections;

a plurality of electrode sections on which said sensor sections are mounted;

an amplification section; and a plurality of wiring sections for connecting said electrode sections and said amplification section, characterized in that an area of each wiring section is substantially the same by changing the width of each wiring section in order to match the composite capacitance of each electrode section and of each wiring section connected thereto in each sensor, so as to cancel the difference of capacitance depending on the length of each wiring section.

6. The arrangement structure of ultra-high resolution pixel electrodes according to any one of claims 1 through 5, characterized in that a detection device comprising said plurality of sensor sections, said plurality of electrode sections, said plurality of wiring sections and said amplification section is regarded as one block, and is disposed with another block of a similar detection device facing each other so as to double the number of pixels of the sensor sections.

7. A signal processing method in the arrangement structure of ultra-high resolution pixel electrodes according to claim 6, characterized in that when signals are extracted from said plurality of sensor sections in time series, the signals are first extracted from the first sensor section of a first block, then from the first sensor section of an opposite block, then from the second sensor section of the first block, and the extraction is repeated sequentially until the last sensor section so as to decrease the influence of leak signals from an adjacent wiring section.

\* \* \* \* \*